United States Patent [19]

Horrwarth et al.

[11] Patent Number: 4,480,380

[45] Date of Patent: Nov. 6, 1984

[54] MOUNTING ARRANGEMENT FOR ELECTROMOTOR

[75] Inventors: Ernst Horrwarth, Achern; Karl Schweikert; Hans J. Weckerle, both of Bühl, all of Fed. Rep. of Germany

[73] Assignee: Robert Bosch GmbH, Stuttgart, Fed. Rep. of Germany

[21] Appl. No.: 489,843

[22] Filed: Apr. 29, 1983

Related U.S. Application Data

[62] Division of Ser. No. 150,407, May 13, 1980.

[30] Foreign Application Priority Data

Jun. 2, 1979 [DE] Fed. Rep. of Germany ....... 2922676

[51] Int. Cl.$^3$ ............................................. H02K 15/14
[52] U.S. Cl. ........................................ 29/736; 29/596; 310/42; 310/89; 310/90
[58] Field of Search ................. 29/596, 598, 732, 736; 310/42, 89, 90

[56] References Cited

U.S. PATENT DOCUMENTS

| | | | |
|---|---|---|---|
| 3,419,957 | 1/1969 | Stone | 29/596 |
| 3,431,625 | 3/1969 | Schenk et al. | 29/596 X |
| 3,483,409 | 12/1969 | Phillips | 29/596 X |
| 3,714,705 | 2/1973 | Lewis | 29/736 X |

Primary Examiner—Carl E. Hall
Attorney, Agent, or Firm—Michael J. Striker

[57] ABSTRACT

A mounting arrangement for an electromotor having an elongated shaft includes a pair of bearings positioned on two opposite ends of the shaft and a pair of bearing covers closing the openings in an electromotor housing through which the elongated shaft extends. The bearing covers are permanently deformable in the direction of elongation of the shaft to compensate undesirable axial play which may occur in the asembled electromotor.

3 Claims, 3 Drawing Figures

MOUNTING ARRANGEMENT FOR ELECTROMOTOR

CROSS-REFERENCE TO A RELATED APPLICATION

This application is a divisional application of application Ser. No. 150,407, filed May 13, 1980.

BACKGROUND OF THE INVENTION

Field of the Invention

The invention relates to electromotors and more particularly to a mounting arrangement of the electromotor having a longitudinal shaft with two opposite ends mounted in the bearings, wherein an axial play may occur between the assembled elements and to an adjusting arrangement for eliminating the forementioned play.

The known arrangements normally have a housing to accommodate the electromotor, a pair of bearings arranged on the ends of the motor shaft and covers closing the bearings. In order to obtain a compensation for axial play of the motor shaft compensating springs have been mounted on the shaft in the known assemblies one of which is described for example in German patent DE-PS No. 12 07482. Normally in the known arrangements of the foregoing type shims or washers are mounted between the bearing covers and the corresponding abutment surfaces of the motor shaft to compensate the manufacturing allowances. The installation of the compensation springs is relatively expensive with respect to manufacturing and material expenses. Further more, it is desirable to obtain a relatively large interior of the electromotor housing in the types of constructions wherein the housing itself and the mounting arrangement are comparatively small. The installation of the shims increases the assembling work because at least one bearing cover used in the assembly must be repeatedly inserted or dismantled in the assembly until the play is eliminated.

SUMMARY OF THE INVENTION

It is an object of the invention to eliminate axial play of the motor shaft in assembled electromotors arising as a result of manufacturing tolerances provided in the mounting elements.

Another object of the invention is to improve the mounting arrangement of an electromotor having an elongated shaft and a pair of bearings positioned at the opposite ends of the motor shaft.

These and other objects of the invention are achieved by a mounting arrangement having a housing surrounding the electromotor, having an elongated shaft, a pair of bearings positioned on two opposite ends of the shaft and a pair of bearing covers closing the housing at two opposite ends thereof. At least one of the bearing covers is manufactured to be permanently deformable in the direction of elongation of the shaft to compensate undesirable axial play which may occur in the assembled electromotor.

The bearing cover may be formed with a substantially flat portion positioned adjacent to the housing of the electromotor and a dome-shaped portion adapted to accommodate the bearing.

The bearing cover may also include an intermediate portion between the flat portion and the dome-shaped portion which is elevated in the direction of elongation of the shaft.

This intermediate portion may include corrugations or may be tapered in the longitudinal direction.

The aforementioned objects may also be attained by provision of an adjusting arrangement for the electromotor of the foregoing type comprising a support member for supporting one end of the assembled electromotor and positioned adjacent to one bearing cover, a press pad for supporting another end of the assembled electromotor and positioned adjacent to another bearing cover and at least one stamp arranged in contact with either bearing cover to push the assembled electromotor in the direction of elongation of the motor shaft to eliminate axial play which may occur in the assembled electromotor.

The force or the path of the stamp in its action may be controlled by any conventional means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF PREFERRED EMBODIMENTS

Figure 1:
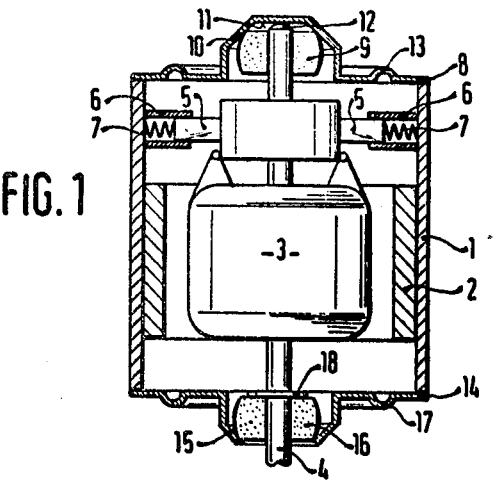
FIG. 1 is a longitudinal section through a first embodiment of a mounting arrangement of the electromotor in accordance with the invention.

The arrangement illustrated in FIG. 1 has a hollow housing 1 of substantially tubular form which accommodates a magnet 2 and a rotor 3 with a motor shaft 4. Sliding contacts or brushes 5 connected to springs 7 are arranged in contact with rotor 3 and supported by supporting elements such as annular rings 6 within the housing 1. The uppermost front surface of the tubular housing 1 is closed with a bearing cover 8. This bearing cover accommodates a bearing 9 which supports an upper end of the motor shaft. The bearing cover 8 includes a flat portion adjacent to the tubular housing 1 and a dome-shaped front portion which forms a bearing cage 10 to enclose the bearing 9. The inner relatively flat surface of the bearing cage 10 serves as an abutment surface for the upper end surface 12 of the motor shaft 4. The bearing cover 8 is also provided with projections 13 which are arranged concentrically to the dome-shaped bearing cage 10 and formed as outwardly extending ring-shaped corrugations of a flat portion of the bearing cover 8.

The lower front surface of the tubular housing 1 is closed by a bearing cover 14. This bearing cover is also formed with a flat portion enclosing the housing and with a dome-shaped or cup-like portion which constitutes a bearing cage 15 to accommodate a lower bearing 16 mounted on the lowermost end of the motor shaft 4. A flat or horizontal portion of the bearing cover 14 includes outwardly extending projections or corrugations 17 concentrically positioned with respect to the bearing cage 15 and similar to those of the upper bearing cover 8. A circlip 18 is mounted on the motor shaft 4 which is positioned at the inner front surface of the bearing 16.

In the embodiment depicted in FIG. 1 the axial play of the motor shaft 4 is defined by the difference between the axial distance between the inner front surface of the bearing 16 and the inner surface 11 of the bearing edge 10 and the axial distance between the outer front surface of the circlip 18 and the outer front surface of the motor shaft 4. The bearing covers 8 and 14 are permanently deformable in the direction of the elongation of the shaft. This deformability is used to compensate axial play of the assembled motor.

Figure 2:
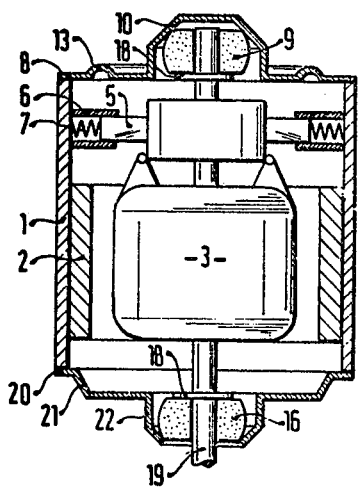
FIG. 2 is a longitudinal section through another embodiment of the invention.

In the embodiment shown in FIG. 2, a tubular housing 1 with a magnet 2 and a rotor 3 is provided of the construction similar to that illustrated in FIG. 2. The sliding contacts or brushes 5 arranged in the support elements 6 and biased by springs 7 in contact with the electromotor 4 are mounted in the interior of the housing 1. An upper bearing cover 8 supports a bearing 9 in the manner described for FIG. 1. The bearings 9 and 16 are mounted on the opposite ends of the motor shaft 19 and are locked thereon by means of circlips 18 respectively positioned at the inner front surfaces of the bearings 9 and 16. The lower bearing cover 14 is replaced in this embodiment by a bearing cover 20. In this construction the outwardly extending ring-shaped projections 17 are substituted by an elevated bulged portion 21 formed between a flat portion of the bearing cover bounding the tubular housing and a cup-like cage 22. The elevated portion 21 may be conically shaped in the axial direction. The latter accommodates the lower bearing 16 in the manner similar to that for FIG. 1.

The axial play of the motor shaft 19 is defined by the difference between the axial distance between the outer front surface of the upper circlip 18 and the outer front surface of the lower circlip 18 and the axial distance between the inner front surface of the bearing 9 and the inner front surface of the bearing 16. The bearings 9 and 16 are rigidly arranged in the axial direction of the shaft so that the outer abutment surfaces of the bearings are positioned against the corresponding inner surfaces of the bearing cages 10 and 22 respectively. The axial play is again compensated by permanently deformable bearing covers 8 and 20.

Figure 3:
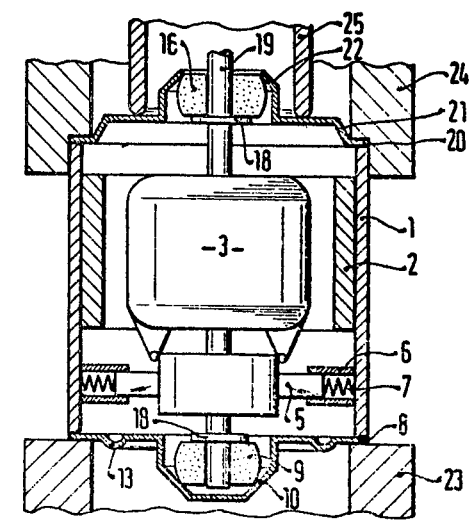
FIG. 3 is a longitudinal section through still another embodiment of the invention.

FIG. 3 shows an adjusting device for eliminating an axial play in the elements of the electromotor, wherein the electromotor described for FIG. 2 is mounted on the adjusting device. The setting device includes a support element or seat 23, an annular press pad 24 and a ring-shaped stamp 25. The bearing cover 8 is positioned on the edge of the seat 23. The motor housing 1 together with the elements assembled thereon is pressed between the seat 23 and press pad 24 by a stamp 25 whereby the connection between the covers 8 and 20 and the tubular housing 1 is additionally secured. A similar device may be mounted on a lower side of the electromotor. When the axial play of the motor shaft 19 mounted in the electromotor is established by loading the same in two opposite axial directions the stroke or path of the cylindrical stamp 25 is made to correspond to the magnitude of the axial play to be eliminated plus the plastic (permanent) axial deformation of the covers 8 and 20. By pushing the stamp 25 in the axial direction by the length of a predetermined stroke, the elimination of axial play will be easily obtained. The path or stroke of stamps 25 may be so adjusted that the elimination of the axial play of the motor shaft 19 caused by undesirable combination of manufacturing allowances will be warranted in all cases. The plastic deformability of the bearing covers 8 and 20 may be so selected by loading the covers in two opposite axial directions that axial play will be eliminated in all possible cases. Either bearing cover after loading will be more or less permanently deformed. By returning the stamps 25 to their initial positions bearing covers 8 and 20 will be urged back to their initial positions whereby the adjusted distance obtained between two opposite covers will correspond to the required distance.

The force or the path of the stamp 25 may be controlled by any conventional means.

The circular projections 13 and 17, and also an elevated portion of the bearing covers increase, a permanent deformability of the covers.

In small power electromotors, and particularly in wiper motors utilized in motor vehicle industry wherein the bearings are clamped by the bearing covers it is absolutely necessary to eliminate the axial play. Large axial forces occur only in the direction of the bearing and are transmitted from the inner parts to the outer parts of the assembly. It is therefore advantageous to utilize this construction with the relatively short pole rings.

It will be understood that each of the elements described above, or two or more together, may also find a useful application in other types of mounting arrangement differing from the types described above.

While the invention has been illustrated and described as embodied in a mounting arrangement it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An adjusting device for eliminating axial play in an assembled electromotor including an elongated shaft and mounted within a housing, a pair of bearings positioned on the opposite ends of said shaft, and a pair of opposite bearing covers closing the housing at the opposite ends thereof and each including an edge portion, a dome-shaped central portion and an intermediate portion formed between said edge portion and said central portion, the adjusting device comprising a support member mountable in contact with the edge portion of one bearing cover for supporting one end of the assembled electromotor; at least one press pad element mountable in contact with the edge portion of another bearing cover to support another end of the assembled electromotor; and at least one stamp mountable in contact with the intermediate portion of said another bearing cover and near the central portion thereof to push the assembled electromotor against said support member in the direction of elongation of said shaft to thereby eliminate axial play which may occur in the assembled electromotor.

2. The device of claim 1, wherein a stroke of said stamp is controlled.

3. The device of claim 1, wherein a force provided by said stamp is controlled.

* * * * *